United States Patent [19]
Masuda

[11] Patent Number: 5,431,988
[45] Date of Patent: Jul. 11, 1995

[54] ORNAMENTAL FILM

[75] Inventor: Yasutoshi Masuda, Kashiwara, Japan

[73] Assignee: Kabushiki Kaisha Meiwa Pax

[21] Appl. No.: 254,863

[22] Filed: Jun. 6, 1994

[30] Foreign Application Priority Data

Jul. 24, 1993 [JP] Japan .................................. 5-202642

[51] Int. Cl.[6] ............................................. B32B 27/32
[52] U.S. Cl. ........................................ 428/213; 428/7;
428/8; 428/9; 428/35.7; 428/36.92; 428/53;
428/58; 428/200; 428/910
[58] Field of Search .................... 283/94, 98; 428/7, 8,
428/9, 35.7, 36.92, 53, 58, 200, 713, 910

[56] References Cited

FOREIGN PATENT DOCUMENTS 60-188111 9/1985 Japan .

*Primary Examiner*—Patrick J. Ryan
*Assistant Examiner*—Rich Weisberger
*Attorney, Agent, or Firm*—Armstrong, Westerman, Hattori, McLeland, & Naughton

[57] ABSTRACT

The invention provides an ornamental film comprising a laminate structure consisting of two biaxially oriented films and a thermally fusible polyolefin layer interposed between the films, characterized in that the biaxially oriented film has a decorative layer either on a face side or on a reverse side, that the thermally fusible polyolefin layer has a thickness corresponding to 25~70% of the total thickness of the laminate structure, and that the bond strength between the biaxially oriented film and thermally fusible polyolefin layer has been controlled at 20~170 g/15 mm. This ornamental film is advantageous in that when formed with slits or cutouts and expanded three-dimensionally, it is protected against tear propagation, that it lends itself well to vapor deposition, that it can be incinerated for disposal, and that it is comparatively inexpensive.

2 Claims, 4 Drawing Sheets

ORNAMENTAL FILM

FIELD OF THE INVENTION

This invention relates to an ornamental film which can be three-dimensionally expanded for decking out the scenes of various events and festivities including the Yuletide, New Year and Star Festivals.

BACKGROUND OF THE INVENTION

Whether in the United States of America or elsewhere in the world, it is common practice to use an ornamental film which has a printed or vapor-deposited decorative surface and can be expanded three-dimensionally utilizing preformed slits or cutouts for adding an atmosphere of festivity to various occasions such as Christmas, New Year and Star Festivals.

As the base film for such an ornamental film, polyvinyl chloride film has heretofore been employed in most instances. The reason why polyvinyl chloride film is a virtually exclusive choice is that whereas films of other types tend to tear and break when expanded utilizing slits or cutouts, polyvinyl chloride film elastically resists such tearing forces.

However, under the current rigorous control over chemical substances for protection of the environment, polyvinyl chloride film cannot be disposed of by incineration, with the result that the user finds difficulties in disposing of the film when it is no longer needed or has become useless. Moreover, since polyvinyl chloride film is low-melting and flexible and contains large amounts of stabilizer, slip agent and other additives, it does not necessarily lend itself well to processing by vapor deposition.

Under the circumstances the inventors of this invention attempted to employ a biaxially oriented polyester or polypropylene film which can be incinerated without environmental hazards and is compatible with vapor deposition and comparatively inexpensive in lieu of polyvinyl chloride film but when slits or cutouts are formed in it, the film tends to develop fine tears when expanded three-dimensionally.

Having been conceived and developed in light of the above situation, this invention has for its object to provide an ornamental film which is less liable to tear even if it is formed with slits or cutouts, highly compatible with a vapor deposition process, disposable by incineration, and comparatively inexpensive.

SUMMARY OF THE INVENTION

The ornamental film of this invention comprises a laminate structure consisting of a couple of biaxially oriented films 1, 1 and a thermally fusible or hot-melt type polyolefin layer 2 interposed between said films, each of said biaxially oriented films carrying a decorative layer 3 either on its face side or on its reverse side, the thickness of said thermally fusible polyolefin layer accounting for 25-70% of the total thickness of the laminate structure and the laminate strength of said biaxially oriented film and thermally fusible polyolefin layer being controlled at 20-170 g/15 mm.

DETAILED DESCRIPTION OF THE INVENTION

Figure 1:
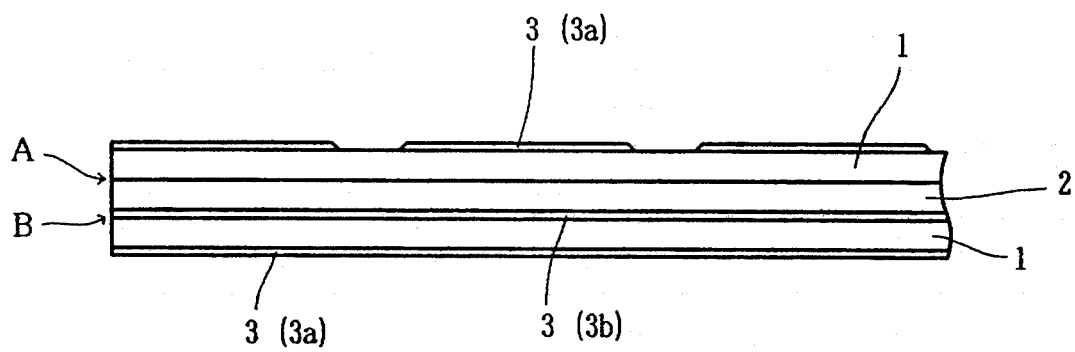
FIG. 1 is a schematic view showing an example of the ornamental film according to this invention.

The ornamental film of this invention essentially comprises a laminate structure consisting of a couple of biaxially oriented films 1, 1 and a thermally fusible polyolefin layer 2 interposed between said films, namely a three-layer structure of biaxially oriented film 1/thermally fusible polyolefin layer 2/biaxially oriented film 1.

The biaxially oriented film 1 is preferably a biaxially oriented polyester or polypropylene film. The recommended thickness of each biaxially oriental film 1 is about 5-40 $\mu$m.

The thermally fusible polyolefin layer 2 may for example be a layer formed from a low-density polyethylene, linear low-density polyethylene, ethylenevinyl acetate copolymer, ethylene-acrylic ester copolymer or unoriented polypropylene. The recommended thickness of the thermally fusible polyolefin layer 2 is about 8-30 $\mu$m.

While the laminate structure of biaxially oriented film 1/thermally fusible polyolefin layer 2/biaxially oriented film 1 can be obtained by several alternative processes such as a process which comprises melt-extruding a polyolefin resin for said thermally fusible polyolefin layer 2 between said two biaxially oriented films 1, 1 to form a sandwich structure or a process which comprises extruding a polyolefin resin for said thermally fusible polyolefin layer 2 onto one of said biaxially oriented films 1 and concurrently pressing the other biaxially oriented film 1 against the polyolefin layer 2 being formed.

The biaxially oriented film 1 is provided with a decorative layer 3 on its face or reverse side. The decorative layer 3 may for example be a layer formed by printing or a layer formed by vapor deposition on the entire surface or in a predetermined pattern on the surface. It is good practice to provide both a print layer 3a and a vapor deposition layer 3b.

When the decorative layer 3 is to be formed on the reverse (inner) side of the biaxially oriented film 1, it is, of course, necessary to form the decorative layer 3 on the biaxially oriented film 1 before the lamination procedure. In this case, it is good practice to provide for an anchor coating layer on the surface of the biaxially oriented film 1 so as to insure an improved adhesion between the film and the decorative layer 3, especially the vapor deposition layer 3b.

In accordance with this invention, said thermally fusible polyolefin layer 2 is formed in a thickness corresponding to about 25-70% of the total thickness of the laminate. When the thickness of said polyolefin layer 2 deviates from this range, the ornamental film is liable to tear around the slits or cutouts on three-dimensional expansion.

Furthermore, in this invention, the laminate strength between biaxially oriented film 1 and thermally fusible polyolefin layer 2 is controlled at 20-170 g/15 mm, preferably 30-150 g/15 mm. When the laminate strength is less than 20 g/15 mm, the film is not sufficiently protected against tearing when it is provided with slits or cutouts or undergoes delamination across the section of slits. On the other hand, when the laminate strength is greater than 170 g/15 mm, the film is not well protected against tearing, either, when it is formed with slits or cutouts.

The laminate strength can be controlled within the above range by various techniques, for example a method which comprises leaving the reverse (inner) side of the biaxially oriented film 1 untreated, e.g. not oxidized, a method which comprises controlling the fusing temperature of the polyolefin resin for said thermally fusible polyolefin layer 2 in the lamination stage, a method which comprises blasting ozone against the film being melt-extruded or a method which comprises selecting the optimum type and coating amount of an anchor-coating agent when an anchor coat is provided.

The laminate film of the above construction can be marketed as formed with slits or cutouts 4 beforehand. Of course, the laminate film without slits or cutouts can be supplied to the market so that the user may process it into his desired product by forming such slits or cutouts.

The ornamental film of this invention is characterized in that the thickness of the thermally fusible polyolefin layer 2 accounts for 25–70% of the total thickness and that the laminate strength between the biaxially oriented film 1 and thermally fusible polyolefin layer 2 is controlled within the range of 20–170 g/15 mm. Thus, when the thickness of the intermediate polyolefin layer 2 relative to the total thickness of the laminate is controlled within the specified range and the laminate strength is controlled at a comparative low value, an appropriate degree of delamination occurs when the ornamental film with slits or cutouts is expanded three-dimensionally and the polyolefin layer 2 in the form of a single layer serves to effectively prevent propagation of tears.

The following examples are intended to describe this invention in further detail.

EXAMPLE 1

This example is now described with reference to FIGS. 1, 2 and 3.

As said biaxially oriented films 1, 1, a 12 μm-thick biaixally oriented polyester film carrying an aluminum vapor deposition layer 3b on one side and a 12 μm-thick plain biaxially oriented polyester film without a vapor deposition layer were provided.

A low-density polyethylene for said thermally fusible polyolefin layer 2 was melt-extruded from an extrusion machine onto the vapor deposition layer of said biaxially oriented polyester film carrying an aluminum deposition layer and, at the same time, the untreated side of said plain biaxially oriented polyester film was pressed against the polyolefin layer being formed to provide a laminate film. The thickness of said thermally fusible polyolefin layer 2 was 12 μm or 33.3% of the total thickness of the laminate. Then, both exposed sides of the laminate film were printed to form a printed pattern layer 3a, 3a on each side.

The resultant laminate film was a multi-layer structure consisting of print layer 3a/biaxially oriented film 1/thermally fusible polyolefin layer 2/vapor deposition layer 3b/biaxially oriented film 1/print layer 3a as illustrated in FIG. 1. The laminate strength across interface A and that across interface B (FIG. 1) were 50 g/15 mm.

Figure 2:
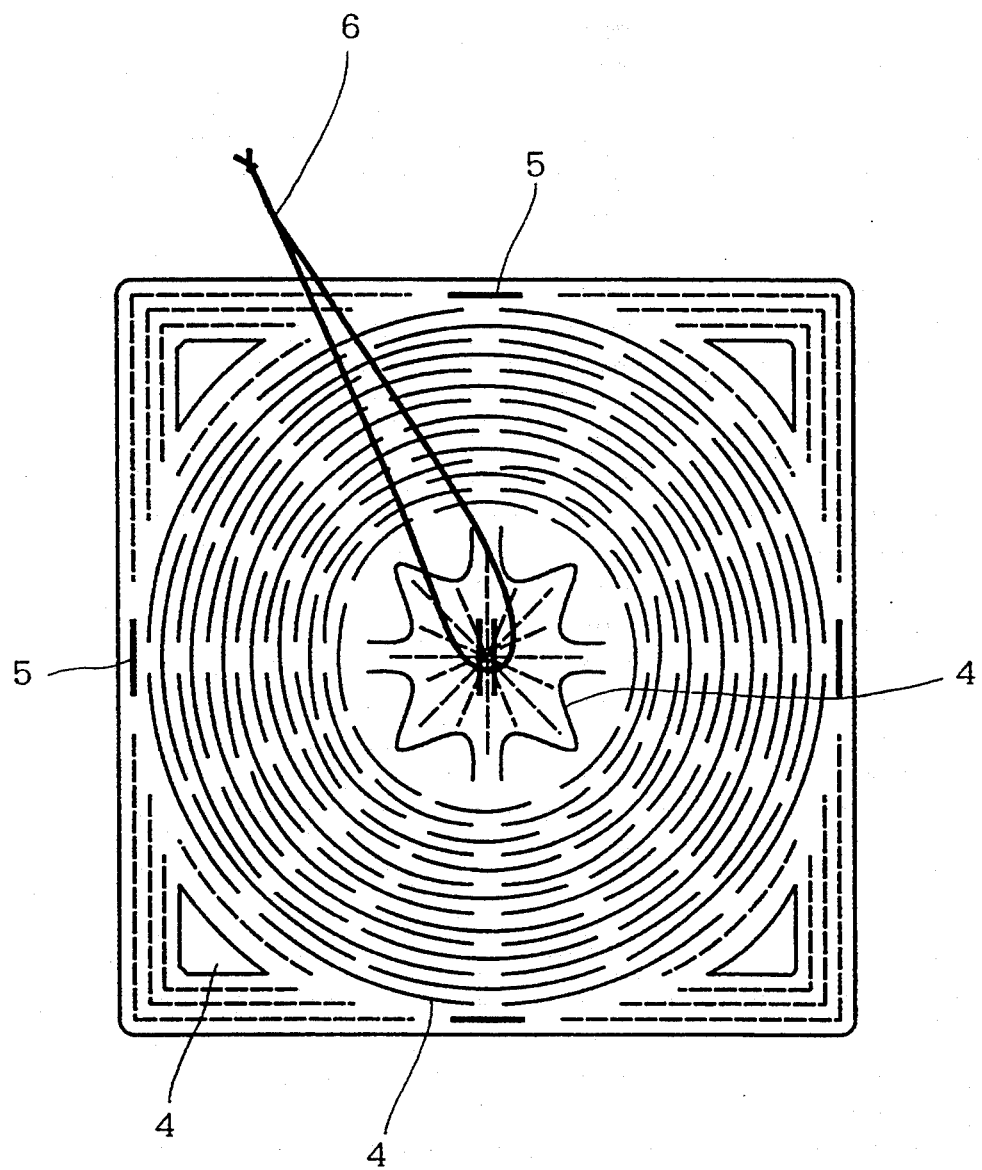
FIG. 2 is a plan view showing the ornamental film of FIG. 1 which has been provided with slits or cutouts 4.
Figure 3:
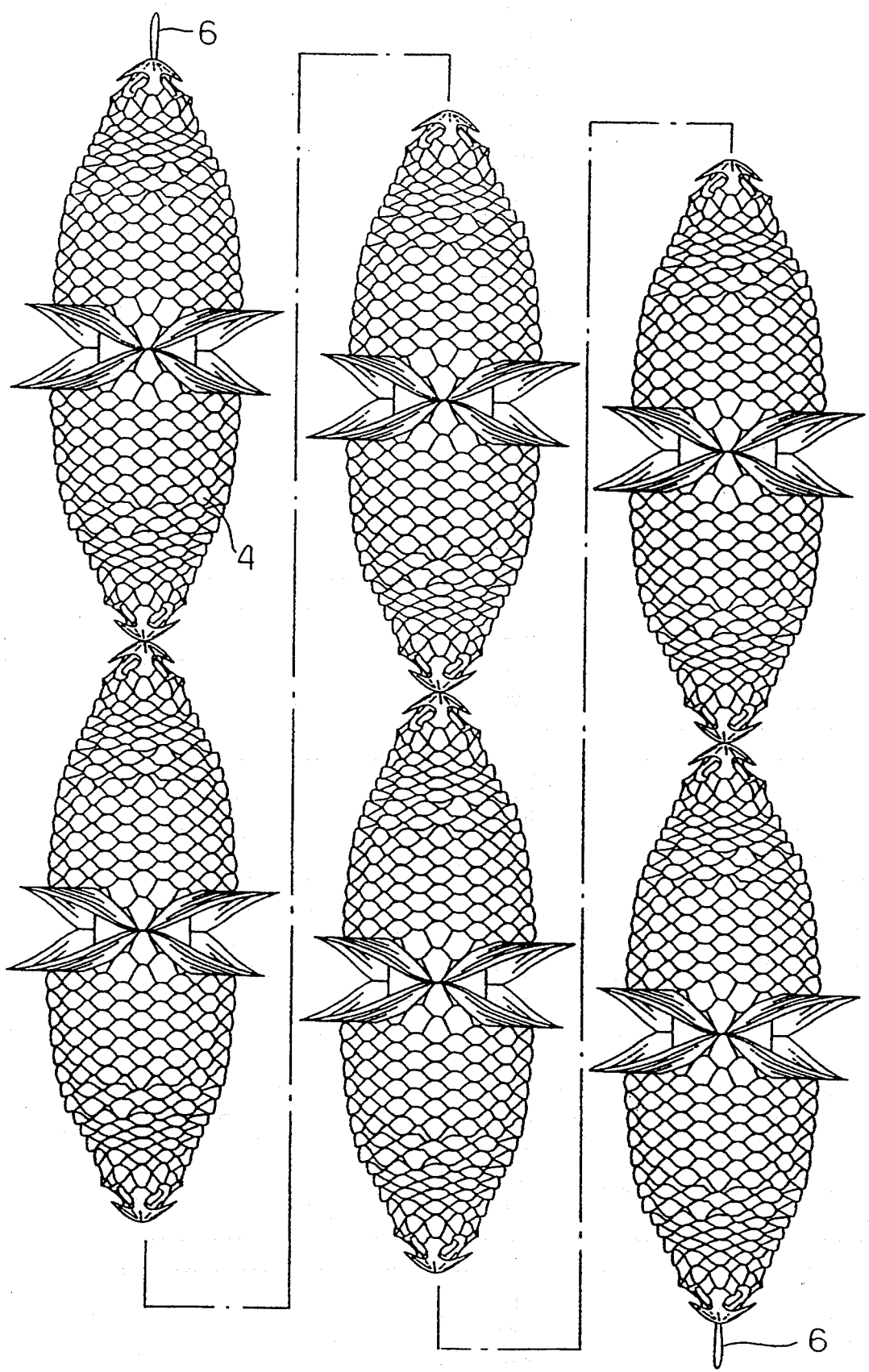
FIG. 3 is a view showing said ornamental film of FIG. 2 as expanded.

This laminate film was formed with slits or cutouts 4 as shown in FIG. 2. Twelve units of this ornamental film were laid one upon another and the 1st and 2nd units, the 2nd and 3rd units, the 3rd and 4th units, ... the 11th and 12th units were respectively fastened together with staples 5 in the centers of four sides. In addition, the 2nd and 3rd units, the 4th and 5th units, the 6th and 7th units, the 8th and 9th units and the 10th and 11th units were respectively fastened together with staples 5 in the same manner. Then, a cord 6 was attached to the center of the 1st unit and another cord to the center of the 12th unit. When the cords 6, 6 were gently pulled, the assembly was expanded three-dimensionally as shown in FIG. 3 to provide an attractive ornament. In the course of expansion, no propagation of tear or break occurred at all.

COMPARISON EXAMPLE 1

The procedure of Example 1 was repeated except that the the laminate strength of interfaces A and B in FIG. 1 was set at 10 g/15 mm. When this laminate film was formed with slits or cutouts 4 and expanded, delamination occurred and, moreover, breaks due to propagation of tears developed.

COMPARATIVE EXAMPLE 2

The procedure of Example 1 was repeated except that the laminate strength of interfaces A and B was set at 200 g/15 mm. When this film was expanded three-dimensionally after formation of slits or cutouts 4, tear propagation occurred to cause breaks.

EXAMPLE 2

Figure 4:
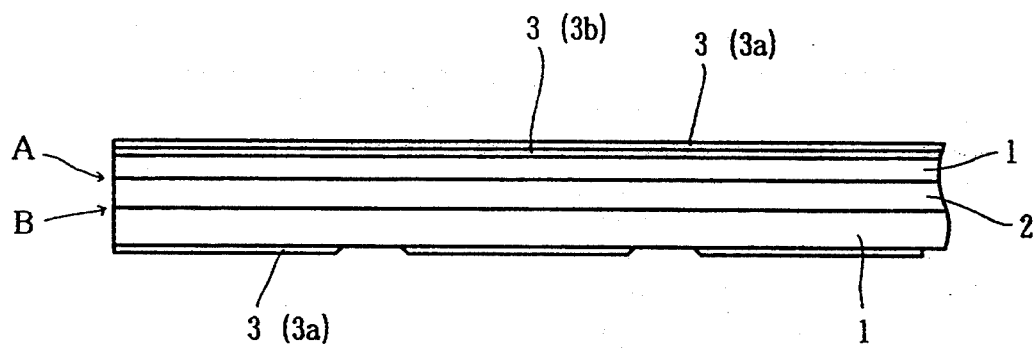
FIG. 4 is a schematic cross-section view of another example of the ornamental film according to this invention.

Another ornamental film of this invention is schematically illustrated in FIG. 4.

As the biaxially oriented films 1, 1, a couple of 12 μm-thick biaxially oriented polyester films were provided and a low-density polyethylene for said thermally fusible polyolefin layer 2 was melt-extruded between the two biaxially oriented polyester films to provide a laminate film. The thickness of the thermally fusible polyolefin layer 2 was 25 μm or 51.0% of the total thickness of the laminate.

One side of the above laminate film was subjected to aluminum vapor deposition to form a deposition layer 3b and, then, both exposed sides of the film were printed to provide a pattern layer 3a on either side.

This finished laminate film consisted of print layer 3a/vapor deposition layer 3b/biaxially oriented film 1/thermally fusible polyolefin layer 2/biaxially oriented film 1/print layer 3a, as illustrated in FIG. 4. The laminate strength of interfaces A and B in FIG. 4 was 90 g/15 mm.

This laminate film was formed with slits or cutouts similar to those shown in FIG. 2 and, then, expanded three-dimensionally but no breaks were encountered.

EXAMPLE 3

The procedure of Example 2 was repeated except that two 16 μm-thick biaxially oriented polypropylene films were used as said biaxially oriented films 1, 1 and polypropylene was used as the polyolefin resin for said thermally fusible polyolefin layer 2. The thickness of the thermally fusible polyolefin layer 2 was 13 μm or 28.9% of the total thickness of the laminate.

The laminate strength of interfaces A and B shown in FIG. 4 was 60 g/15 mm.

This laminate film was formed with slits or cutouts 4 and expanded three-dimensionally but no breaks occurred at all.

Thus, in addition to the advantage of inhibited tear propagation which has been pointed out hereinbefore, the ornamental film of this invention is further advantageous in that because a biaxially oriented film is used as the base film, it lends itself well to vapor deposition, that it can be incinerated for disposal, and that it is comparatively inexpensive.

What is claimed is:

1. An ornamental film comprising a laminate structure consisting of two biaxially oriented films and a thermally fusible polyolefin layer interposed between said films, said biaxially oriented film having a decorative layer either on a face side or on a reverse side thereof, said decorative layer being at least one layer selected from the group consisting of a print layer and a vapor deposition layer, said thermally fusible polyolefin layer having a thickness corresponding to 25-70% of the total thickness of the laminate structure and the laminate strength of said biaxially oriented film and thermally fusible polyolefin layer being controlled at 20-170 g/15 mm.

2. The ornamental film according to claim 1 which is formed with slits or cutouts by which it can be expanded three-dimensionally.

* * * * *